(12) United States Patent
Rashid et al.

(10) Patent No.: US 8,917,842 B2
(45) Date of Patent: *Dec. 23, 2014

(54) CALLER ID MEMO SYSTEM

(71) Applicants: Mamoon Rashid, Toronto (CA); Sivakumaran Sanmugasuntharam, Markham (CA); Anton Mendoza, Mississauga (CA)

(72) Inventors: Mamoon Rashid, Toronto (CA); Sivakumaran Sanmugasuntharam, Markham (CA); Anton Mendoza, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,718

(22) Filed: Nov. 28, 2012

(65) Prior Publication Data

US 2013/0089190 A1 Apr. 11, 2013

Related U.S. Application Data

(63) Continuation of application No. 12/882,845, filed on Sep. 15, 2010, now Pat. No. 8,345,844, which is a continuation of application No. 11/098,485, filed on Apr. 5, 2005, now Pat. No. 7,817,790.

(30) Foreign Application Priority Data

Jun. 25, 2004 (CA) ..................................... 2474083

(51) Int. Cl.
*H04M 1/56* (2006.01)
*H04M 15/06* (2006.01)
*H04M 3/436* (2006.01)
*H04M 3/533* (2006.01)
*H04M 3/02* (2006.01)
*H04M 3/42* (2006.01)
*H04M 3/56* (2006.01)
*H04M 3/53* (2006.01)

(52) U.S. Cl.
CPC ........ *H04M 3/4365* (2013.01); *H04M 3/53391* (2013.01); *H04M 2201/39* (2013.01); *H04M 3/02* (2013.01); *H04M 3/42059* (2013.01); *H04M 3/56* (2013.01); *H04M 3/42042* (2013.01); *H04M 3/5322* (2013.01); *H04M 2203/253* (2013.01)
USPC .............. 379/142.06; 379/88.22; 379/142.18; 379/74; 709/201

(58) Field of Classification Search
USPC ........ 379/142.06, 88.22, 142.18, 74; 709/201
See application file for complete search history.

(56) References Cited

U.S. PATENT DOCUMENTS 5,241,586 A * 8/1993 Wilson et al. ............... 379/88.11
6,148,063 A * 11/2000 Brennan et al. ................ 379/72

(Continued)

OTHER PUBLICATIONS

Rashid, Mamoon, et al. "Caller ID Call Memo System", U.S. Appl. No. 12/882,845, Filed Sep. 15, 2010.

*Primary Examiner* — Simon King
(74) *Attorney, Agent, or Firm* — Perry + Currier, Inc.

(57) ABSTRACT

A system and method of saving and delivering a voice memo or text memo to identify incoming calls is provided. A user of the system of the invention is given the option of recording a memo on the calls he or she has received through a prompt on a telecommunication device. The user can choose to record a voice memo or text memo after each call. The memos are saved in connection with caller id information pertaining to the number from which the call was placed. When a user of the system receives a call from a number that has a memo saved in relation thereto, the user will be prompted to hear, and may listen to, the voice memo before answering the call. If the memo is in text form, the user can configure the system to provide various processing options. In one processing option, a text to speech audio presentation of the text of the memo is made available to permit the message to be heard over a telephone or networked audio capable PDA device. In other processing options, the user has the text of the message sent to the user's PC or emailed or sent by instant message to the user's PDA device.

11 Claims, 8 Drawing Sheets

(56) References Cited

U.S. PATENT DOCUMENTS

| | | | |
|---|---|---|---|
| 6,310,940 B1 * | 10/2001 | Ratz | 379/88.01 |
| 7,012,999 B2 * | 3/2006 | Ruckart | 379/88.21 |
| 7,817,790 B2 * | 10/2010 | Sanmugasuntharam et al. | 379/142.06 |
| 2005/0129205 A1 * | 6/2005 | Klein | 379/201.04 |

* cited by examiner

FIG. 1

Whenever the user receives a call, the system compares the CallerID with the database. If there is a memo it informs the user about the memo — 34

If the user wants to listen to the memo, he can listen to the memo — 36

FIG. 2

After a call, user is prompted to record a voice memo via a phone — 38

The memo is recorded against the CallerID of the caller in a database connected to the CMS system — 40

FIG. 3

Associate phone with a PC through the PC network address —44

FIG. 4

Whenever the user receives a call, the system compares the CallerID with the memo database and association directory —46

If there is a memo it is sent to the PC at the network address associated with the user —48

FIG. 5

After a call, user is prompted to enter a memo on the PC —50

The memo is recorded against of the CallerID of the caller in a database connected to the CMS system —52

FIG. 6

Associate a PDA with a phone through the PDA address — 56

FIG. 7

Whenever the user receives a call, the system compares the CallerID with the memo database and association directory — 58

If there is a memo it is sent to the PDA in a form of SMS messaging or instant messaging. — 60

FIG. 8

After a call, user is prompted to enter a text memo by SMS messaging or email — 62

The memo is recorded against the CallerID in a database connected to the CMS system — 64

CALLER ID MEMO SYSTEM

PRIORITY CLAIM

The present application is a continuation of U.S. application Ser. No. 12/882,845, filed on Sep. 15, 2010 (now Allowed), which is a continuation of U.S. application Ser. No. 11/098,485, filed on Apr. 5, 2005 (now U.S. Pat. No. 7,817,790), which claims priority from the Canadian Application 2,474,083, the contents of which are incorporated herein by reference.

FIELD OF THE INVENTION

This invention relates to the field of telecommunications and, in particular, relates to the identification of a caller by a memo associated with the number from which the call has been placed or to which a call is being placed.

BACKGROUND OF THE INVENTION

Although alphanumeric caller identification systems have been in use, no systems presently allow for the recording of a voice memo or text memo to provide a specific message about the caller and permit organized call management by the called party. While the identification of the number and/or name of a calling party may be beneficial to the called party for day to day or residential use, such information is necessarily very limited and may be insufficient in many situations, particularly in a business environment where copious calls are received at a quick pace. Upon seeing the calling party phone number and/or name, the called party may not recognize the caller, and/or may not recollect any detailed information about the calling party, without first answering the call.

Certain systems, such as U.S. Pat. No. 6,009,158 to Romero, disclose alphanumeric caller identification callback devices that allow a user to automatically place telephone calls to previously received caller identification directory numbers. These systems do not, however, permit recording of any voice memo or text memo from the called party. The number and/or name of the calling party that appears in the traditional caller id may not be enough information to permit the called party to identify the reason for which the caller is calling, and/or any previous conversations the called party may have had with the caller. This system allows a called party to be more fully informed of the caller, and to hear or read a memo about the caller before responding.

SUMMARY OF THE INVENTION

The present invention provides a method for identifying incoming telephone calls and/or callers through the use of a voice or text memo caller identification.

In another of its aspects, the present invention provides a method for providing information relating to a called number to a remote answering service that includes information identifying the called number, greeting information and details of the incoming telephone call.

In yet another of its aspects, the present invention provides a method for providing audio information from an audio database during a call.

In one manner of operation of the invention, each time a called party receives a call, upon termination of the call, the user that received the call may record a voice memo, to be associated with the phone number of the incoming call. This message will be replayed to the user in the future when another call is received from that number. The voice memo is a tool made available to a user of the system of the invention that is intended to assist the user in recollection of previous conversations, ongoing discussions, and the like. When a subsequent call is made from that number, the most recently recorded memo on the number will be played to the user, at the user's election, before the user answers the call.

The system permits the user to listen to a pre-recorded message about the caller before answering the call. Advantageously, the user may reflect upon the nature of the call before responding. The voice memo affords the caller the opportunity to take appropriate steps to handle the call. For example, the user may hear the message and choose to ignore the call, noting there is no new information to be provided to the caller. Or, the user, that is to say the called party, may hear the message and locate relevant paperwork on the caller before answering the call.

The system is equally applicable to different network and telecommunications processes. For example, a user of the system of the invention may be actively using a PC. In such a case, the telephone number of the telephone of that user is associated with the network address of the PC, which typically will be the IP address of that PC. Whenever a caller calls the user at his or her telephone number of the telephone phone which is associated with a PC network address, the PC that the user is active at would be pushed with the call memo at the given PC network or IP address. As another example, a user of the system of the invention that is a subscriber to a PDA service can send a message relating to the last call via SMS or email. When the user subsequently receives a call from that number, the system would send it a text memo to the user's PDA in the form of SMS or email. Some PDA devices include telephone capabilities, therefore, the destination telephone may actually be the PDA device depending on the services that the user has subscribed to.

The system is also applicable for different processes. For example, the memo could be stored on the number being called (DNS) instead of the caller's number. This would work as a memo for remote receptionist. When a client calls a company, say 1-800-**, it would be forwarded to a remote operator who handles several other companies as well. As the call is being transferred, the PC of the operator whose Internet Protocol (IP) address is attached to the 1-800-** would be populated with a memo that would have greeting information relating to the company that was called. The greeting information includes company identification information, a company directory, status information for each individual of the company (e.g. Mike is in a meeting) and provide a place to take a memo relating to the call. For example, if the number called was 1-800-ABCD, the receptionist would be able to respond to the call, and if a call memo was created, it would be stored in a location that the 1-800-ABCD staff 1-800-ABCD staff could later access. The page presented to the receptionist preferably also has functions of a regular office phone system such as transfer calls to an extension and so on. The receptionist can take memo relating to the received call for each extension and the memo would be sent as an email to the person associated with the phone extension or the person can access the message through the Internet.

The memo system is generic in the sense that the recording of the call memo could also take place during conversation. So the user can use part of the conversation as a memo. And the memo could also be played during a conversation so the calling party can listen to the conversation as well.

The memo database is flexible as well so the user can import voice memos or files from another program or database and assign them codes.

An aspect of the specification provides a method of providing a call memo associated with a particular telephone number comprising:

(a coupling a destination telephone to a call management system to enable caller-id information and audio data from the destination telephone to be exchanged with the call management system;
(b receiving an inbound call at the destination telephone;
(c performing processing at the call management system including the steps of:
 (i parsing the received caller-id information to obtain the calling telephone number;
 (ii querying a call memo database using the calling telephone number; and
 (iii for a located record in the call memo database, providing a memo cue to notify the called party of a call memo associated with the telephone number of the incoming call.

The method can further include the step of recording said call memo.

The recorded call memo can be a voice memo that is recorded using said destination telephone.

The recorded call memo can be a voice memo that is recorded using a computer coupled to said call management system to capture audio and calling telephone number information or by uploading a file containing the call memo and calling telephone number information.

The recorded call memo can be a text memo that is recorded using a PDA device and sent as a message to said call management system.

The method can further include the step of prompting a called party to record a voice memo upon completion of a call at the destination telephone.

The prompt to record the voice memo can comprise an audible tone or a voice message.

The method can further include the step of receiving and recording a call memo from said destination telephone.

The method can further include the step of receiving a call memo message from a computer in communication with said call management system.

The method can further include the step of receiving a call memo message that is recorded using a PDA device and sent as a message to said call management system.

The memo cue can be an audible tone or a message.

Another aspect of the invention provides a method of providing a call memo associated with a particular telephone number via SMS or email, comprising:
(a coupling a destination telephone to a call management system to enable caller-id information and audio data from the destination telephone to be exchanged with the call management system;
(b providing an association directory record accessible to said call management system to associate an SMS or email message address with said destination telephone;
(c receiving an inbound call at the destination telephone;
(d performing processing at the call management system including the steps of:
 (i parsing the received caller-id information to obtain the calling telephone number;
 (ii querying a call memo database using the calling telephone number; and
 (iii for a located record in the call memo database, providing a call memo message to the message address contained in said association directory that includes caller-id information of the telephone number of the incoming call.

This can further include the step of providing a prompt to the destination telephone to enter a call memo upon completion of a call to said destination telephone.

This method can further include the step of receiving and recording a call memo from said destination telephone following providing said prompt.

The method can further include the step of providing a prompt message to the message address contained in said association directory to notify the called party to enter a call memo upon completion of a call to said destination telephone.

The method can further include the step of receiving and recording an SMS or email message containing a call memo message from the SMS or email message address associated in said association directory with said destination telephone number following said step of providing said prompt message.

Another aspect of the invention provides a method of providing a call memo associated with a particular telephone number via a network accessible computer, comprising:
(a providing a call management system;
(b coupling a destination telephone to said call management system to enable caller-id information and audio data from the destination telephone to be exchanged with the call management system;
(c providing an association directory record accessible to said call management system to associate a network address of a network accessible computer with said destination telephone;
(d receiving an inbound call at the destination telephone;
(e performing processing at the call management system including the steps of:
 (i parsing the received caller-id information to obtain the calling telephone number;
 (ii querying a call memo database using the calling telephone number; and
 (iii for a located record in the call memo database, providing a call memo message to the message address contained in said association directory that includes caller-id information of the telephone number of the incoming call.

The method can further include the step of providing a prompt to the destination telephone to enter a call memo upon completion of a call to said destination telephone.

The method can further include the step of receiving and recording a call memo from said destination telephone following providing said prompt.

The method can further include the step of providing a prompt message addressed to the network address contained in said association directory to notify the called party to enter a call memo upon completion of a call to said destination telephone.

The method can further include the step of receiving and recording a message containing a call memo from the network address associated in said association directory with said destination telephone number following said step of providing said prompt message.

The network address can be an Internet Protocol (IP) address.

Another aspect of the specification provides a method of providing a call memo associated with a particular telephone number via a network accessible computer, comprising:
(a providing a call management system;
(b coupling a destination telephone to said call management system to enable caller-id information and audio data from the destination telephone to be exchanged with the call management system;
(c providing an association directory record accessible to said call management system to associate a network address of a network accessible computer with said destination telephone;
(d receiving an inbound call at the destination telephone;
(e performing processing at the call management system including the steps of:

(i) querying a call memo database using the destination telephone number; and (ii) for a located record in the call memo database, providing a call detail memo to the network address contained in said association directory containing information relating to the destination telephone number and relating to the calling telephone number.

The call detail memo information relating to the destination telephone number can include the greeting, company directory, status of each extension.

This method can further include the step of including the received caller-id information in said call detail memo information.

This method can further include the step of recording a call memo relating to the inbound call.

This method can further include the step of sending said call memo to an email address.

This method can further include the step of making said call memo available for access via a computer network.

The computer network can be the Internet.

Another aspect of the invention provides a method of providing a voice memo during a call comprising the steps of:
(a) providing a call management system;
(b) coupling a first telephone to said call management system (CMS) to enable audio data in a voice database accessible to the CMS to be exchanged;
(c) establishing a call between said first telephone and a second telephone;
(d) performing processing at the call management system including the steps of:
 (i) monitoring the call between the first telephone and the second telephone for a trigger event;
 (ii) parsing the trigger event to obtain a command;
 (iii) performing the command against the voice database.

The step of performing the command against the voice database can provide playback of an audio record in the voice database to the call.

The step of performing the command against the voice database can provide recording the call to an audio record in the voice database.

The trigger event can be depressing at least one predetermined key of said first telephone.

The trigger event can be depressing at least one predetermined combination of keys of said first telephone.

The trigger event can be the combination of depressing at least one predetermined of key of said first telephone and providing a voice command to said first telephone.

In yet another aspect of the invention, any particular voice memo could be played to the calling party at any point in the conversation. A playback trigger activates playback of the voice memo. In one manner of operation, the playback trigger is a telephone number sequence entered during the conversation. In another manner of operation, the playback trigger is telephone number sequence and voice instruction which is deciphered by the call management system to locate the desired voice memo for playback.

Another aspect of the specification provides a method of providing a call memo associated with an originating telephone comprising:
(a) coupling a destination telephone to a call management system to receive supervisory signalling at the call management system relative to the originating telephone and the destination telephone and to interact with the destination telephone;
(b) receiving an inbound call from an originating telephone at the call management system, said inbound call destined for the destination telephone;

(c) prior to connecting the inbound call to the destination telephone, performing processing at the call management system including the steps of:
 (i) parsing, at the call management system, caller-id information received with said inbound call to obtain a calling telephone number associated with the originating telephone;
 (ii) identifying, based on a call memo database and the calling telephone number, a call memo associated with the calling telephone number;
 (iii) after said destination telephone is off-hook, and prior to connecting the inbound call to the destination telephone, providing a playback of the identified call memo at the destination telephone;
 (iv) during the playback of the identified call memo, monitoring for a predetermined key press at the destination telephone and if a predetermined key press is detected interrupting the playback of the identified call memo, prior to the completion of the identified call memo and at the time said predetermined key press is detected;
(d) after the playback or after the interrupting, connecting the inbound call to the destination telephone.

Yet another aspect of the specification provides a call management system for providing to a destination telephone a call memo associated with an originating telephone comprising:
a network interface for operably coupling the call management system to the destination telephone and the originating telephone to receive supervisory signalling relative to the originating telephone and the destination telephone;
the call management system configured to:
(a) receive an inbound call from an originating telephone, said inbound call destined for the destination telephone;
(b) prior to connecting the inbound call to the destination telephone, perform processing at the call management system including the steps of:
 (i) parsing caller-id information received with said inbound call to obtain a calling telephone number associated with the originating telephone;
 (ii) identifying, based on a call memo database and the calling telephone number, a call memo associated with the calling telephone number;
 (iii) after said destination telephone is off-hook, and prior to connecting the inbound call to the destination telephone, providing a playback of the identified call memo at the destination telephone;
 (iv) during the playback of the identified call memo, monitoring for a predetermined key press at the destination telephone and if a predetermined key press is detected interrupting the playback of the identified call memo, prior to the completion of the identified call memo and at the time said predetermined key press is detected;
(c) after the playback or after the interrupting, connecting the inbound call to the destination telephone.

The invention will now be explained with reference to the appended drawings, which are briefly described as follows.

DETAILED DESCRIPTION OF THE PREFERRED EMBODIMENT

The invention is operable using a number of voice and text based communication systems to permit the user of the system to record and obtain memos relating to the caller ID of a caller that the user of the system has communications with. In the case of telephone based communications, the caller will be identified by the caller ID information provided by the telephone service provider of the user of the system. When the user of the system has a telephone service that includes providing caller ID information then each in-bound call that the user of the system receives will include any available information to identify the caller. The minimum information available generally includes the caller ID dial number indicating the telephone number that the caller is using to place the call to the user of the system. In addition, the caller ID information can include alpha numeric information such as alpha numeric information providing the caller's name or the business name of the caller. When the user of the system receives an in-bound call the system will compare the caller ID received from the user's telephone service provider and that caller ID information will be used to access the database maintained the system. If there is a memo in the database, then the contents of that memo will be made available to the system user before the in-bound call is accepted. The database can include audio files that will play back or can be text based memos that a text-to-audio converter will read to provide the memo information to the user of the system. For example, when the user of the system is a real estate agent, the memo information can include details about the properties previously shown to the caller. If the user of the system wishes to listen to the memo then an interaction with the system can take place to indicate to the system that the user wishes to listen to the memo.

If the user does not wish to listen to the memo, the system can be directed to connect the user with the caller and the call can take place in the normal fashion. The user can provide preferences for the play back of a memo. For example, the user can configure the system to provide playback of the memo without prompt. When the memo is being played back, the user can interrupt the playback by pressing a selected predetermined number on the telephone that the memo is being listened to at. When the user picks up the phone, if there is a memo, it will be played and pressing a key on the telephone handset can interrupt the playing of that memo. The foregoing description describes how the information recorded in the memo database is made available to a user when the communications between the user and a caller takes place over the telephone system.

Figure 1:
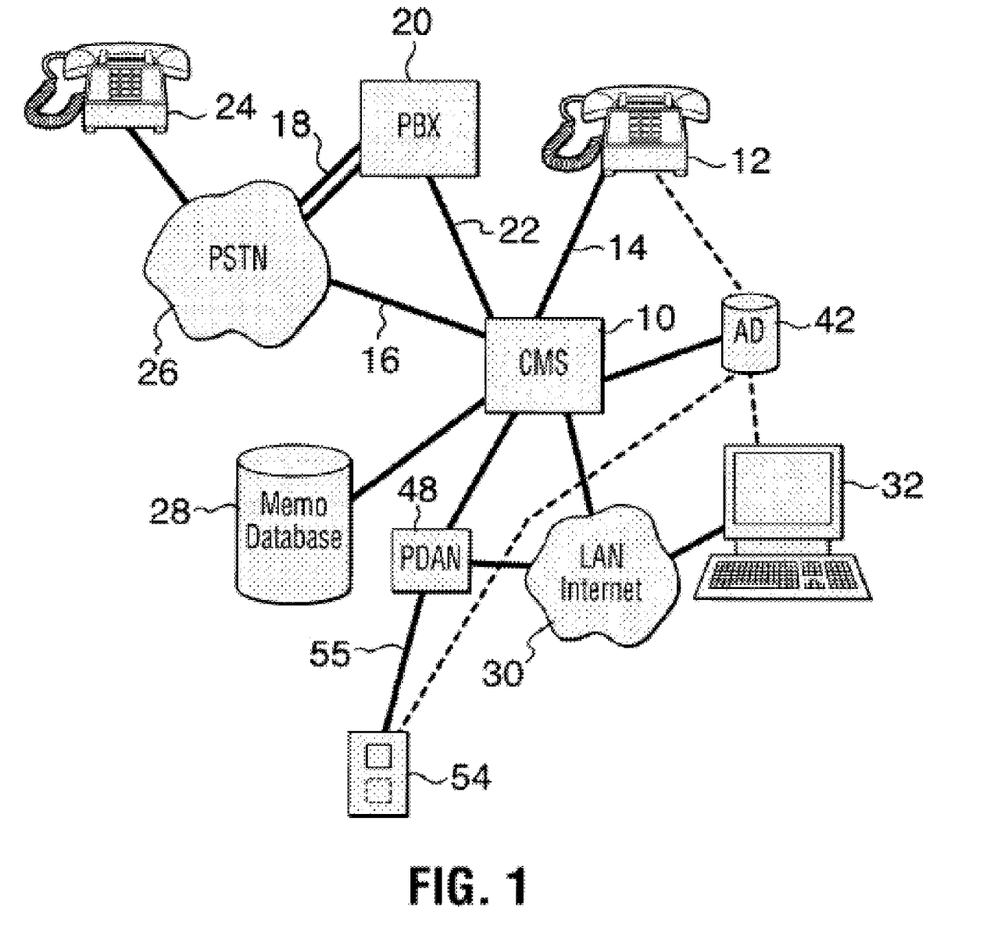
FIG. 1 is a functional block diagram of an arrangement of equipment adapted to carry out the system of the invention.

FIG. 1 shows a functional block diagram of an arrangement of elements adapted to carry out the system of the invention. The invention has a call management system (CMS) 10 which is interconnected with the communications facilities of the user of the system in a manner described in more detail hereafter. In relation to communications between a user and a caller taking place over the telephone system, the user of the system has a telephone set 12 having a keypad and handset to facilitate placing and receiving calls over the telephone network. The telephone set 12 is coupled to the call management system 10 via a telephone line 14 that extends between CMS 10 and the telephone handset 12. The public switched telephone network (PSTN) telephone line 16 is coupled to CMS 10 to permit CMS to receive supervisory signalling and interaction with the user operating telephone handset 12. The supervisory signalling includes such information as ring signalling and on-hook/off-hook detection to enable CMS 10 to determine when a call is being received by handset 12 and receive the caller ID information from the public switched telephone network over the telephone line 16. Moreover the on-hook/off-hook detection of telephone handset 12 is used to enable the system to prompt the user for further instruction in the manner that will be described in more detail with reference to the other figures of the drawings.

As will be understood, it is not necessary for handset 12 to be a direct connection to the public switched telephone network over telephone line 16. The system of the invention will also operate in a business environment where the business has a number of telephone lines 18 interconnecting with a private branch exchange (PBX) 20 situated at the customer premises. The line extending from the PBX 20 to the telephone handset 12, namely line 22 of the user for telephone handset 12 is routed to the CMS 10 to permit the CMS 10 to intercept the same calling signalling as was described with reference to the signalling monitoring and supervisory signalling intercept described with reference to line 16. Thus when a caller from an originating telephone 24 makes a call to the user's telephone 12 through the PSTN 2 6, the caller ID information relating to the calling telephone 24 is provided to CMS 10 via the line 16 or 22 to which handset 12 is coupled. In this manner, CMS 10 is inter-operable with telephone 12 to provide and receive audio communications with handset 12 as well as receive caller ID information from the telephone service provider of caller 12. Information relating to the call can be stored in a memo database 28 in one of many forms including an audio recording, a text message, or a specialized multi-media message such as a still image or an audio/video file. The storage and use of the records in the memo database will be explained more fully with reference to other figures of the drawings. However, the memo database 28 is triggered to provide information from the memo database to the subscriber 12 based on the caller ID of the caller using exemplary handset 24 to call the user handset 12. Preferably, CMS 10 is interconnected to a network 30, for example the Internet or a local area network (LAN). In this way, a user can use a personal computer 32 to interact with the CMS 10 to configure CMS 10 or provide memos to CMS 10 for storage in the memo database 28 or instruct CMS 10 to retrieve memos from memo database 28. The memo database is accessible over the Internet 30 so that the user can use a computer 32 to upload other messages.

Figure 2:
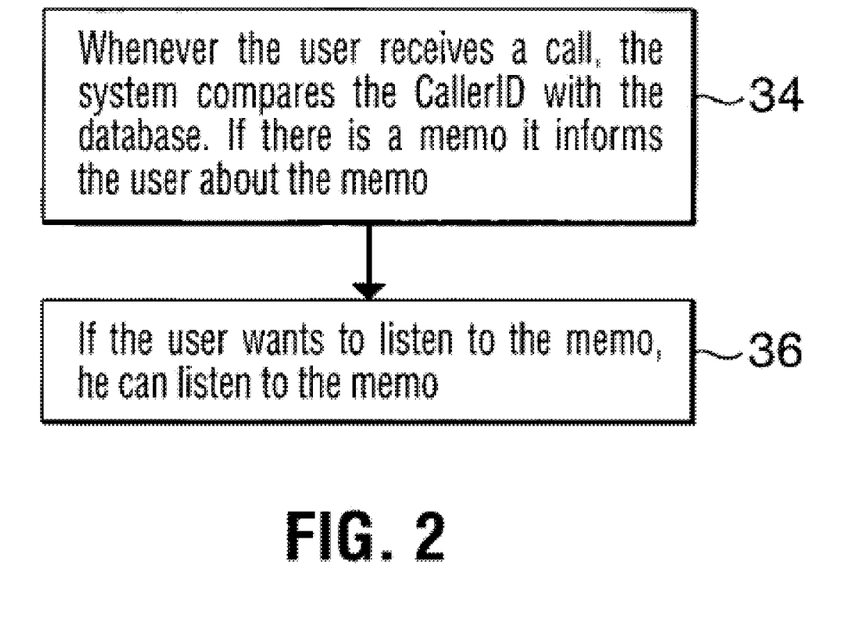
FIG. 2 shows a process flow chart showing use of a caller id voice memo through the system and method of the invention.
Figure 3:
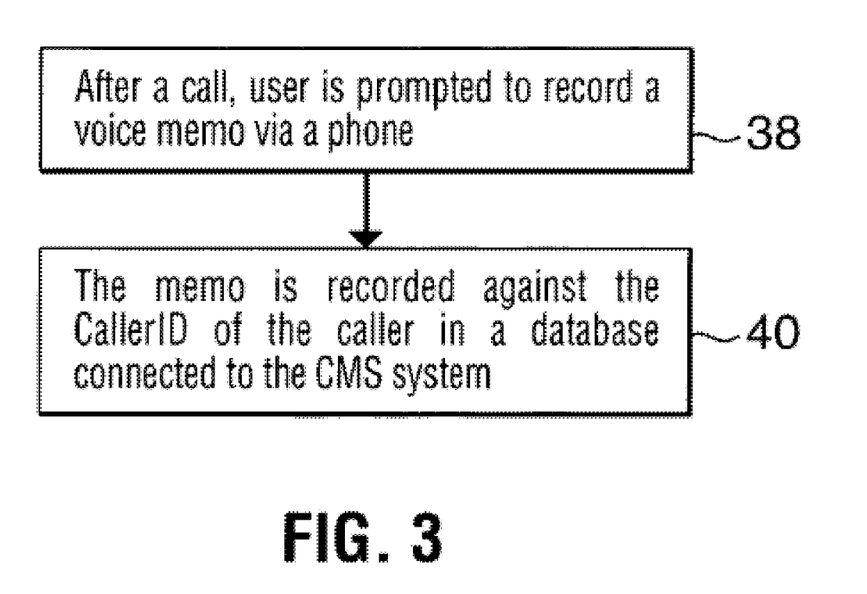
FIG. 3 shows a process flow chart to creation of a caller id voice memo through the system and method of the invention.

FIGS. 2 and 3 show flow charts of the process steps that a user of a telephone 12 would follow to be notified of an existing voice memo or to record a voice memo respectively using a telephone handset to inter-operate with the system of the invention.

FIG. 2 shows a process flow chart of a process flow of CMS 10 when a call from a PSTN caller at a telephone 24 to a user telephone 12 inter-operating with. CMS 10 is made. For calls received over the PSTN 26 at telephone 12 the CMS 10 will perform a check of memo database 28 using the caller id of the calling party. If there is voice memo found in the memo database, a memo cue in the form of an audible tone or a voice message notifies the called party at telephone 12 that a voice memo exists for the caller, as denoted by process box 34 of FIG. 2. On hearing the memo cue, the called party uses the telephone 24 to interact with CMS to listen to the voice memo, or to answer the call directly as illustrated by process box 36.

Reference is now made to FIG. 3, which shows a process flow chart of a process flow of CMS 10 when a call between a user operating telephone 12 and a PSTN caller from telephone 24 is completed.

When a call between a user of a telephone 12 coupled to the CMS 10 of the system of the invention and an outside caller at telephone 24 is completed, CMS 10 provides an audio prompt to the user of telephone 12 to record a voice message or voice memo as depicted by process box 38 of FIG. 3.

The voice memo could be recorded during a conversation as well. All the memos would be accessed when the caller callback. It could also be accessed through the web, sent in the form of attachment to an email to the subscriber or the voice memo can be changed from voice to text and stored in conjunction of the voice memo for easy search.

When a voice message memo is stored upon completion of a call, the voice message is stored in the memo database 28 connected to the CMS 10 as denoted by process box 40 of FIG. 3. The stored voice memo message is organized and recorded in the memo database 28 based on the caller id information of number from which the call was received. The called party operating telephone handset 12 may record a message of any nature, for example summarizing the call or reminding him or her of any action that will need to be taken on the matter or other background information that would be convenient to make available on a subsequently received call. When a subsequent call is placed from the calling number to the subscriber, the recorded message is played back to the user as was previously described with reference to FIG. 2. For example, the most recent voice memo corresponding to the caller ID of the calling party is provided to the called party Referring again to FIG. 1 an association directory (AD) 42 is coupled to CMS 10 to record an association of a user telephone 12 to a personal computer (PC) 32. The PC 32 is in communication with CMS 10 over a network, which is shown in the configuration of FIG. 1 as the Internet 30. But it will be understood, that other networks, such as a local area network extending between PC 32 and CMS 10 can be advantageously used as well. The association directory records the PC address of the PC that is to be associated with the telephone 12, as depicted in FIG. 4 by the process box 44.

Figure 4:
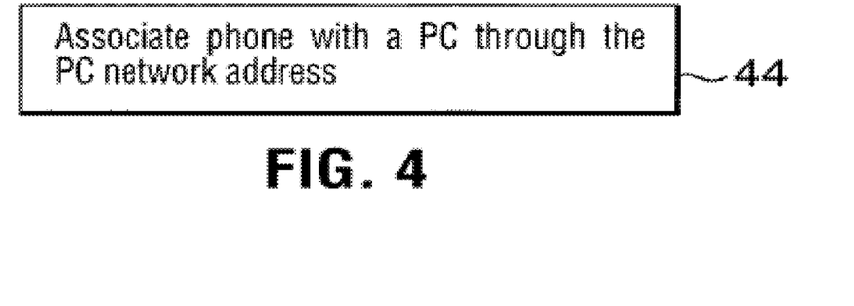
FIG. 4 shows a process flow chart of a process to create an association in an association directory between a user telephone number and personal computer (PC).

FIG. 4 shows a process flow chart of a process to create an association record in an association directory 42 defining an association between the user telephone number of telephone 12 and an associated personal computer (PC) 32. The user wishing to make an association of a telephone 12 to a personal computer 32 enters the telephone number and associated PC network address information into a record in an association directory 42. The information in association directory 42 is then used by CMS 10 to communicate with PC 32 in the manner described more fully with reference to FIGS. 5 and 6.

Figure 5:
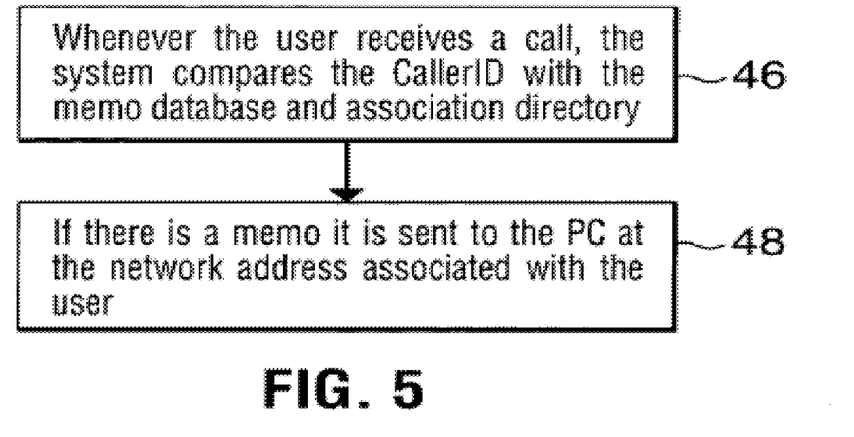
FIG. 5 shows a process flow chart to use a text or multimedia memo in connection with a PC in accordance with a preferred embodiment of the system and method of the invention.
Figure 6:
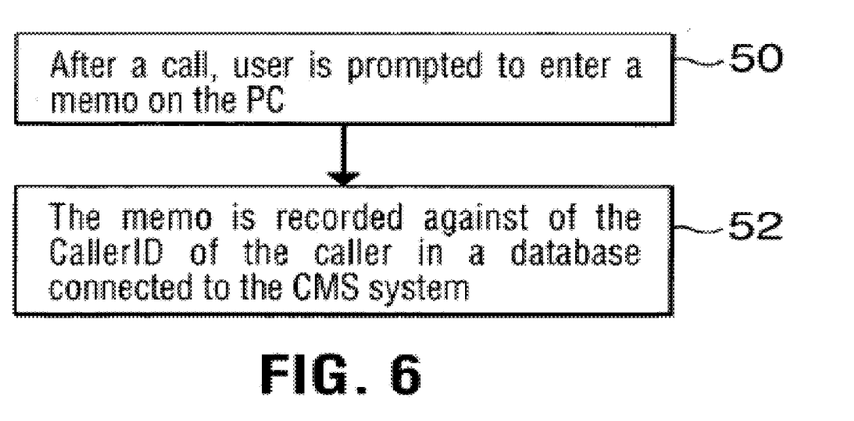
FIG. 6 shows a process flow chart to create a text or multimedia memo in connection with PC in accordance with a preferred embodiment of the system and method of the invention.

FIGS. 5 and 6 show flow charts of the process steps that a user of a telephone 12 would follow to be notified of an existing text or multimedia memo or to record a text or multimedia memo respectively using a personal computer to inter-operate with the system of the invention.

FIG. 5 shows a process flow chart to use a text or multimedia memo in connection with a PC in accordance with a preferred embodiment of the system and method of the invention. The process flow chart of FIG. 5 depicts a process flow of a process thread operating on CMS 10 that is executed when a call from a PSTN caller a telephone 24 is received at a user telephone 12 and a record in association directory 42 associates calls to telephone 12 with a PC 32. For calls received over the PSTN 26 at telephone 12 the CMS 10 will perform a check of memo database 28 using the caller id of the calling party. If there is memo found in the memo database, CMS 10 will check association directory 42 to determine the manner in which to process the memo. If no entry is found in association directory 42 the call will be processed as a voice call in the manner previously described with reference to FIGS. 2 and 3. As depicted by process box 46 of FIG. 5, CMS 10 queries the association directory 42 to determine If an active association entry is found to establish an active association between the called telephone 12 and a PC 32. If an active association is found, CMS 10 causes the memo information from memo database 28 to be delivered to the network interconnecting CMS 10 with associated PC 32. The memo information is presented to the user on PC 32, preferably in the form of a pop up window to facilitate prompt attention from the user to the contents of the memo information as depicted by process box 48. The memo information can take the form of a text message that is presented to the user to read. Alternately or additionally, the memo information can include multimedia content, including audio, video and or pictorial content. The user may be presented with a dialogue box to interact with CMS 10 to take the call, or to play a recording that the caller at telephone 24 can hear to leave a message.

FIG. 6 shows a process flow chart to create a text or multimedia memo in connection with PC in accordance with a preferred embodiment of the system and method of the invention. The process of FIG. 6, is a process flow of CMS 10 when a call between a user operating telephone 12 and a PSTN caller from telephone 24 is completed and the called telephone 12 has an active association with a user PC 32. When a call between a user of a telephone 12 and PC 32 coupled to the CMS 10 of the system of the invention and an outside caller at telephone 24 is completed, the user of telephone 12 is prompted at PC 32 to record a text memo of the call or a multimedia memo such as a voice memo in accordance with the process box 50 of FIG. 6. The memo is stored in the memo database 28 connected to the CMS 10 as denoted by process box 52 of FIG. 6. The stored memo message is organized and recorded in the memo database 28 based on the caller id information of number from which the received call was made or placed. The user, that is the called party, operating actively associated PC 32 may record a call memo message of any nature. For example, a call memo summarizing the call or reminding him or her of any action that will need to be taken on the matter or other background information that would be convenient to make available on a subsequently received call. When a subsequent call is placed from the calling number to the user of the system of the invention, the recorded call memo message is provided back to the user as was previously described with reference to FIG. 5. For example, the most recent text or multimedia memo corresponding to the caller ID of the calling party operating telephone 24 is provided to the called party for display or production for the user at actively associated PC 32.

Referring again to FIG. 1 an association directory (AD) 42 is coupled to CMS 10 to record an association of a user telephone 12 to a personal digital assistant (PDA) device (PDA) 54. The PDA 54 is in communication with CMS 10 over a network, which is shown in the configuration of FIG. 1 as a PDA network (PDAN) 48. Generally, the communications link 55 between PDA device 54 and PDAN 48 is provided as a wireless communications link to the PDA device 54 to permit mobility of the device. However, it will be understood, that the architecture of PDAN 48 may include communication paths to PDA 54 over other networks, such as a local area network (LAN)/Internet 30 that are advantageously used in providing a communications link between CMS 10 and PDA 54. Some PDA devices include telephone capabilities, therefore, the destination telephone 12 may actually be a virtual telephone in the sense that the telephone functionality is provided physically in the PDA device 54 itself, which of course will depend on the services that the user has subscribed to.

Figure 7:
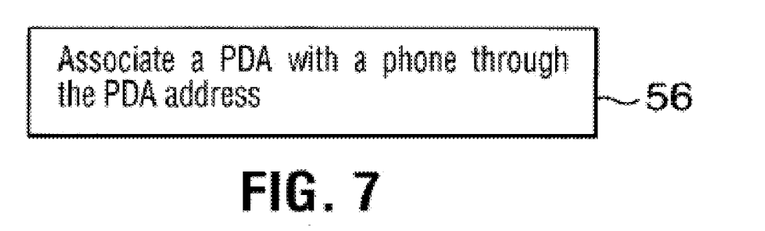
FIG. 7 shows a process flow chart of a process to create an association in an association directory between a user telephone number and a personal digital assistant (PDA) device.

FIG. 7 shows a process flow chart of a process to create an association in an association directory between a user telephone number of the telephone 12 and a personal digital assistant (PDA) device 54. The association directory 42 records the PDA address of the PDA device 54 that is to be associated with the telephone 12, as depicted by the process box 56 of FIG. 7.

Figure 8:
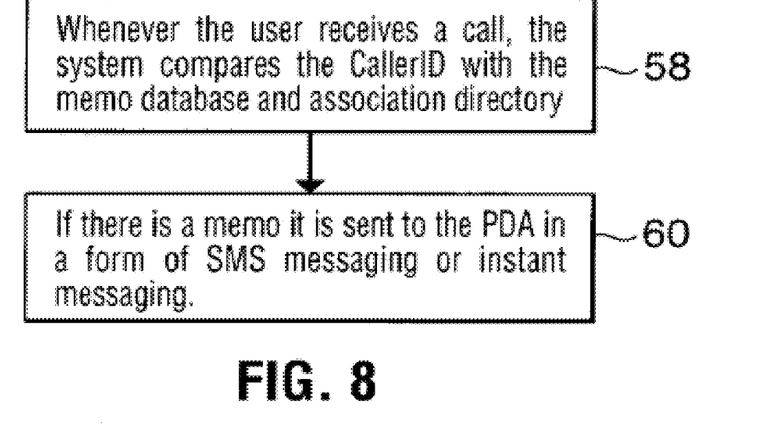
FIG. 8 shows a process flow chart to use a text or multimedia memo in connection with a PDA device in accordance with a preferred embodiment of the system and method of the invention.
Figure 9:
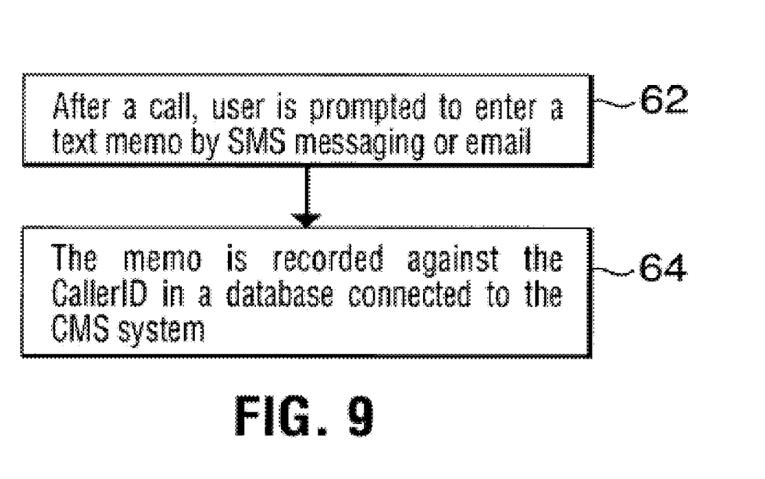
FIG. 9 shows a process flow chart to create a text or multimedia memo in connection with a PDA device in accordance with a preferred embodiment of the system and method of the invention.

FIGS. 8 and 9 show flow charts of the process steps that a user of a telephone would follow to use and receive an existing text or multimedia memo or to record a text or multimedia memo respectively using a personal digital assistant (PDA) device in accordance with the system of the invention.

FIG. 8 shows a process flow chart to use a text or multimedia memo in connection with a PDA device in accordance with a preferred embodiment of the system and method of the invention. The process of FIG. 5 is of a process flow of CMS 10 when a call from a PSTN caller to a user telephone 12 inter-operating with CMS 10 is made where a record in association directory 42 associates calls to telephone 12 with a PDA device 54. For calls received over the PSTN 26 at telephone 12 the CMS 10 will perform a check of memo database 28 using the caller id of the calling party operating, for example, telephone 24. If there is memo found in the memo database, CMS 10 will check association directory 42 to determine the manner in which to process the memo. If no entry is found in association directory 42 the call will be processed as a voice call in the manner previously described with reference to FIGS. 2 and 3. As depicted by process box 58 of FIG. 8, CMS 10 queries the memo database 28 for a call memo record corresponding to the caller-id of the inbound call. If a memo record is found, CMS 10 queries the association directory 42 to determine If an active association entry is found to establish an active association between the called telephone 12 and a PDA 54. If an active association is found, CMS 10 causes the memo information from memo database 28 to be delivered to the network interconnecting CMS 10 with the associated PDA 54. The memo information is presented to the PDA 54 as an SMS or instant message as depicted by process box 60 to facilitate prompt attention from the user to the contents of the memo information. The memo information can take the form of a text message that is presented to the user to read. Alternately or additionally, the memo information can include multimedia content, including audio, video and or pictorial content depending on the capabilities of the PDA device. The user may be presented with an interaction feature of the PDA operating in concert with the CMS 10 over PDAN 48 to take the call, or to play a recording that the caller at telephone 24 can hear to leave a message.

FIG. 9 shows a process flow chart to create a text or multimedia memo with a PDA device 54 in accordance with a preferred embodiment of the system and method of the invention. The process of FIG. 9, is a process flow of CMS 10 when a call between a user operating telephone 12 and a PSTN caller from telephone 24 is completed and the called telephone 12 has an active association with a user PDA 54. When a call between a user of a telephone 12 and PDA 54 coupled to the CMS 10 of the system of the invention and an outside caller at telephone 24 is completed, the user of telephone 12 is prompted at PDA 54 to record an email or a text memo of the call or a multimedia memo such as a picture, video or voice memo in accordance with the process box 62 of FIG. 9. The call memo is stored in the memo database 28 connected to the CMS 10 as denoted by process box 64 of FIG. 9. The stored memo message is organized and recorded in the memo database 28 based on the caller-id information of the telephone 24 from which the call was received. The called party operating actively associated PDA 54 may record a memo of any nature, for example summarizing the call or reminding him or her of any action that will need to be taken on the matter or other background information that would be convenient to make available on a subsequently received call. When a subsequent call is placed from the calling number to the user, the recorded memo is provided back to the user as was previously described with reference to FIG. 8. For example, the most recent text or multimedia memo corresponding to the caller ID of the calling party is provided to the called party for display or production for the user at actively associated PDA 54.

The call memo message can be stored by any of a number of different procedures. In one manner of operation, whenever the user received a call on telephone 12 (or even the PDA device 54 itself, depending on the capabilities of the device and the settings the user has provided in the association database 42), CMS system 10 would send an email to the user PDA 54 prompting the user to enter a message for the last call. The user can enter the message using the PDA by replying to the email with the memo information that is desired. Alternatively, the user can store the memo relating to the call by sending it to a default email address. Using this alternate manner of operation, the email would contain the caller-id of the call that the memo relates to in the subject line to enable CMS 10 to place the message within memo database 28 under the desired caller-id location. If no caller-id information is contained in the subject line of the message, CMS 10 would store the memo message with the last call received at actively associated telephone 12.

Figure 10:
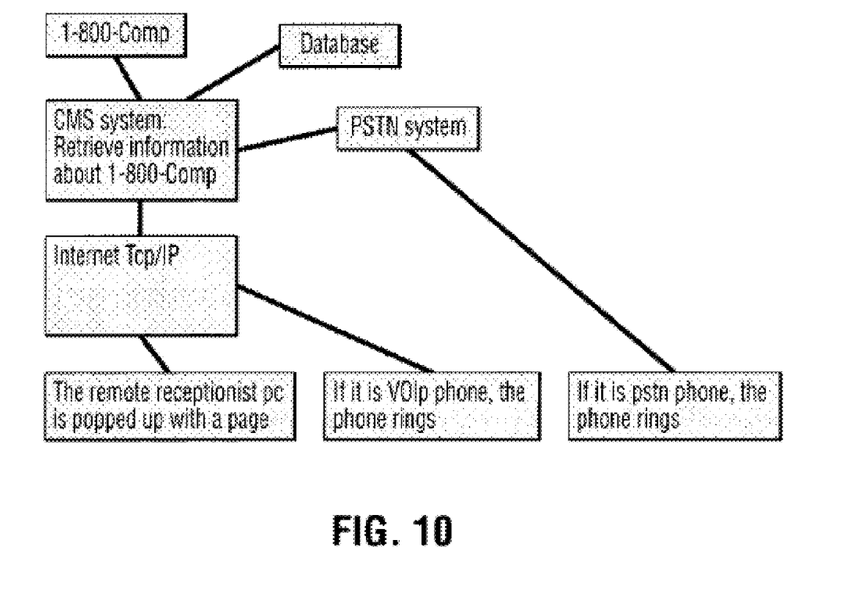
FIG. 10 shows a process flow chart of an alternate embodiment of the invention that uses the number being called as a call memo organized system.

FIG. 10 is a process flow chart of an alternate embodiment of the invention that uses the number being called as a call memo organized system. The memo would be stored on a database by the subscriber at a remote location. When a call is made to a dialed number, the call is forwarded to a call receiving station operated by a receptionist (remote receptionist) who is provided with a telephone to receive the call and a computer to interact with the system of the invention. When the inbound call is received, a memo would be popped or by telephone. Voice recordings can be added by recording from the computer or telephone, or the voice recordings can be included from another database or even provided by a provider of the services of the invention. Organization and use of the voice database is exemplified by the following table:

---

1 Key Press Voice Activation Memo to play #8973 # "Scooby" ScoobyDoobyDoo.vox *345 # "Dream" I_have_a_Dream.vox *345 # "LoveSong" I_will_always_love_you.vox Key Press Voice Activation Memo to record ## # "Record" date_time.vox

Figure 11:
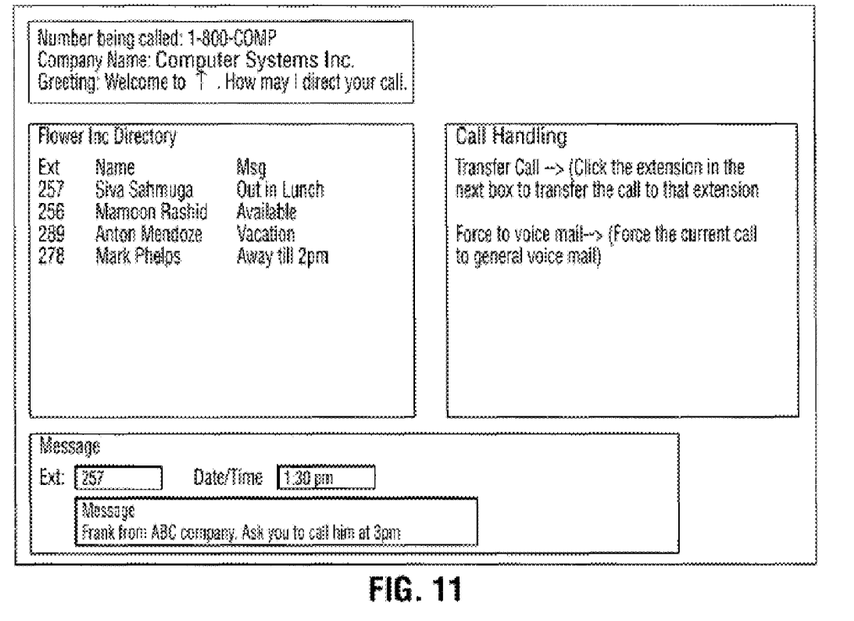
FIG. 11 is an exemplary information page depicting information that would pop-up at a receptionist PC operating the system of FIG. 10.

--- up on the receptionist a PC whose network address, which is typically an IP address, is associated with the number that was dialed by the caller. The stored memo is accessible by the switching facility. The memo would include things like greetings, company directory, and memo on each staff member. It could also include links to control the calls such as call transfer, transfer to voice mail. The remote receptionist could store a memo for each staff member that could be accessed through web or sent in the form of email. An example of the information page that would pop-up at the receptionist PC is shown on in FIG. 11.

Figure 12:
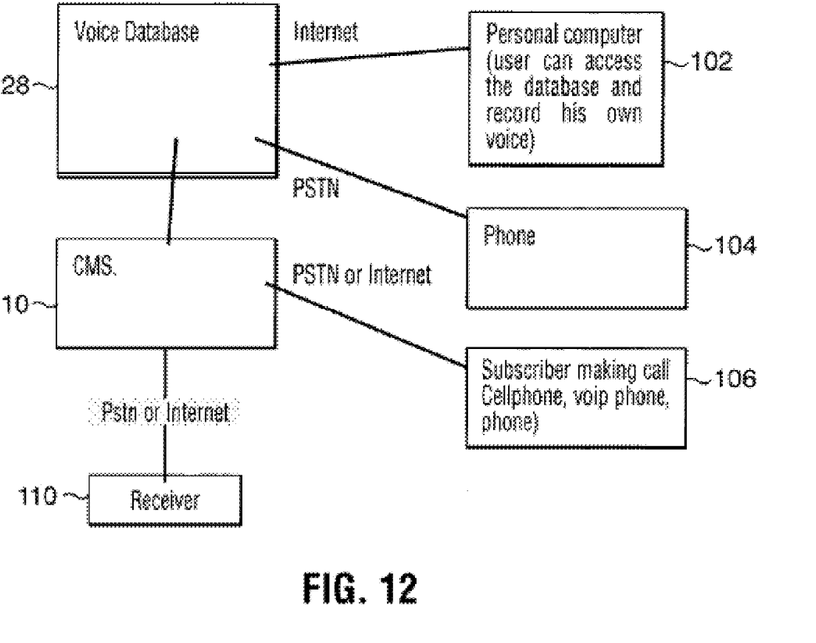
FIG. 12 shows a functional block diagram of an arrangement of equipment of an alternate embodiment of the invention adapted to provide call memo capabilities at any time during a call based on a trigger event.

FIG. 12 shows a functional block diagram of an arrangement of equipment of an alternate embodiment of the invention adapted to provide call memo capabilities at any time during a call based on a trigger event. A voice database 28 provides a repository of audio information that can be recorded from any one of a variety of sources and played back to any one of a variety of receivers. The voice database 28 is accessible from a personal computer (PC) 102 operated by a user that logs onto an application hosted by CMS 10 to maintain the voice database 28 over a network such as the internet. From the personal computer 102, the user provides a user account to gain access to his or her entries in the voice database 28. Once authorized, the user interacts with PC 102/CMS 10 to update that user's voice database entries, by adding voices to the voice database, changing the entries or by deleting entries in the voice database. Similarly, a user of a telephone 104 can dial-in access to CMS 10 over the public switched telephone network to that user's account. Once authorized, the user uses telephone 104 to interact with CMS 10 to update that user's voice database entries by adding voices to the voice database, changing the entries or by deleting entries in the voice database.

On subsequent telephone calls, the user uses their telephone 106, which can be a cellphone, voice over internet protocol (VOIP), phone or POTS PSTN telephone to contact the call management system CMS 10 and place a call to a receiving telephone 110. When a call is completed in this manner, CMS 10 has access to the voice database 28 and monitors the call for a trigger keypress. When the trigger keypress occurs, the selected record from the voice database 28 is played back during the call between the user operating telephone 106 and the other party operating receiver telephone 110. An example illustrating use of the system of the invention to playback voice messages from the voice database 28 follows.

A user of the system of the invention is able to play a voice memo or recording during conversation so that both parties can hear the voice memo. Also, a user of the system of the invention is able to record the conversation of the call. The entire voice memo is recorded in the voice database 28 and is accessed or activated by pressing combination of keys on the phone and may also include voice directed commands. The voice memo database is accessed by the user with a computer For example, when a subscriber is talking to his girlfriend, he can enter a playback trigger, simply by pressing a predetermined key or combination of keys. As shown in the table, the combination of key *345 will activate playback of the song I_will_always_love_you, which would play during the call. The activation trigger can include a combination of key and voice command. Thus, in the table, another way of activating playback of the song I_will_always_love_you is to press the # key and say the words "LoveSong". The playback key trigger or key and voice trigger commands associated with each entry in the voice database are maintained by the user by accessing the voice database in the manner previously described with reference to FIG. 12. A user of the system is able to record the call, or record his or her own voice and specify the trigger key to press or voice activation parameters online or through phone.

Thus the call memo or voice database described herein is useful for containing user recordings recorded by the user of himself or herself or predefined recordings obtained from others. The playback of call memos and voice recordings in the database is configurable to permit only a subscribing user to hear the audio playback of the call or voice memo. Alternately, as described with reference to FIGS. 12 and 13, the audio playback is configurable to be heard by both parties to a call. In one manner of implementation, CMS 10 provides recording playback control or prompts and in another the user is able to control which memo is to play and at what time.

Figure 13:
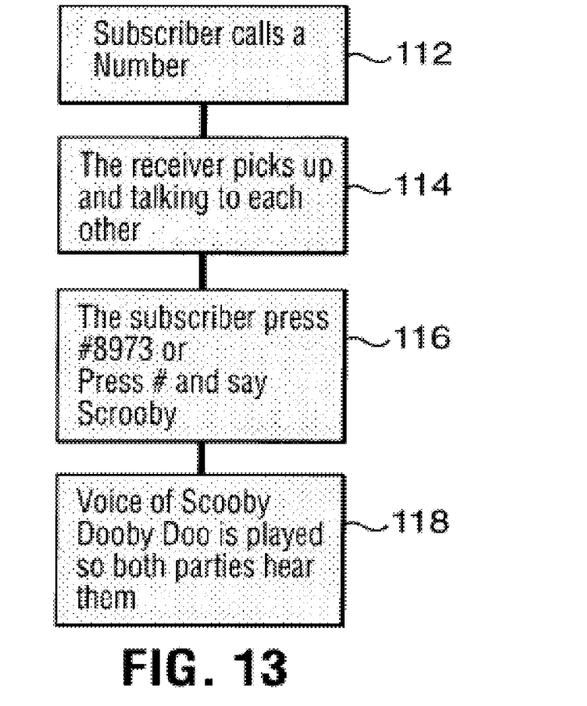
FIG. 13 is a process flow chart of a process of operation of the embodiment of the invention of FIG. 12.

FIG. 13 is a process flow chart of a process of operation of the embodiment of the invention of FIG. 12 where a user initiates a call through CMS 10 to a receiving telephone 110. A subscriber dials the number corresponding to receiver 110 as depicted by process box 112. The party at the receiving station picks up the call to complete the voice communications between the caller and the called party as depicted by process box 114. At this point, CMS 10 is monitoring the calls for the trigger event. The subscriber presses the trigger event, which is shown in process box 116 as #8973 in one manner of presenting the trigger event. Another manner of presenting the trigger event is to use the combination of keystrokes and voice activation which in the example of the trigger event shown in process box 116 is for the subscriber to depress the # key and say SCOOBY. CMS 10 responds to the trigger event by retrieving the corresponding voice message from the voice database 28 and thus the voice or SCOOBY DOOBEY DOO is played so that both parties can hear the playback during the course of the conversation.

Figure 14:
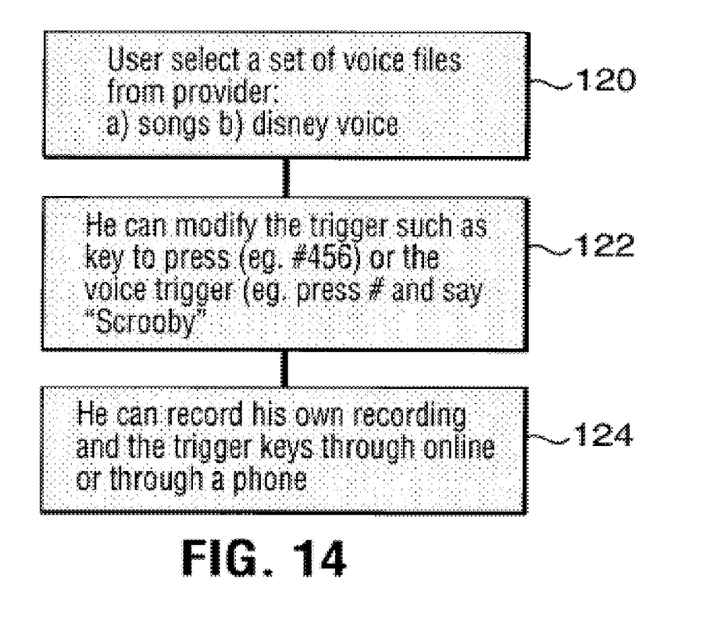
FIG. 14 shows a process flow chart illustrating a process to update to the voice database of the embodiment of FIG. 12.

FIG. 14 shows a process flow chart illustrating a process to update to the voice database of the embodiment of FIG. 12. The user connects to the voice database using either the PSTN or Internet as was previously described with reference to FIG. 12. The user selects a set of voice files from a provider as depicted by process box 120. The voice messages can include, for example, songs or well-known comic characters, such as for example, those of Disney. During maintenance of the voice database, the user can modify the trigger that is associated with each voice as depicted by process box 122. Thus the trigger to trigger the playback of SCOOBY can be set to #456 as shown by process box 122. Alternately, for a voice trigger the voice trigger is entered as the keystroke # and the user provides the corresponding voice reference which is shown in process box 122 as the phrase "SCOOBY". Of course, the user is not restricted to obtaining the voice database repertoire from another provider as was described with reference to process box 120. The user can record his or her own voice recording as depicted by process box 124. Any voice recordings that the user provides would have a corresponding trigger associated with each respective recording as was explained with reference to process box 122.

Now that the invention has been described with reference to the embodiments shown in the attached figures, numerous substitutions and equivalents will occur to those skilled in the art. The invention is not limited to the specific embodiments described but rather is defined in the claims appended hereto.

The invention claimed is:

1. A method of providing a call memo associated with an originating telephone comprising:
   (a) coupling a destination telephone to a call management system to receive supervisory signalling at the call management system relative to the originating telephone and the destination telephone and to interact with the destination telephone;
   (b) receiving an inbound call from an originating telephone at the call management system, said inbound call destined for the destination telephone;
   (c) prior to connecting the inbound call to the destination telephone, performing processing at the call management system including the steps of:
      (i) parsing, at the call management system, caller-id information received with said inbound call to obtain a calling telephone number associated with the originating telephone;
      (ii) identifying, based on a call memo database and the calling telephone number, a call memo associated with the calling telephone number;
      (iii) after said destination telephone is off-hook, and prior to connecting the inbound call to the destination telephone, providing a playback of the identified call memo at the destination telephone;
      (iv) during the playback of the identified call memo, monitoring for a predetermined key press at the destination telephone and if a predetermined key press is detected interrupting the playback of the identified call memo, prior to the completion of the identified call memo and at the time said predetermined key press is detected; and
   (d) after the playback or after the interrupting, connecting the inbound call to the destination telephone.

2. The method of claim 1 further including the step of recording an additional call memo.

3. The method of claim 2 wherein the recorded call memo is a voice memo that was previously recorded using said destination telephone.

4. The method of claim 2 wherein the recorded call memo is a voice memo that is recorded using a computer coupled to said call management system to capture audio and calling telephone number information or by uploading a file containing the call memo and calling telephone number information.

5. The method of claim 1 further including generating a prompt at said destination telephone to record an additional voice memo after the originating telephone hangs up and prior to hanging-up said destination telephone.

6. The method of claim 5 wherein the prompt to record the voice memo comprises an audible tone or a voice message.

7. The method of claim 5 further including receiving and recording a call memo from said destination telephone via the call management system.

8. The method of claim 5 further including receiving a call memo message from a computer in communication with said call management system.

9. The method of claim 5 further including receiving a call memo message that is recorded using a personal digital assistant ("PDA") device and sent as a message to said call management system.

10. The method of claim 5 wherein the memo cue is an audible tone or a message.

11. A call management system for providing to a destination telephone a call memo associated with an originating telephone comprising:
    a network interface for operably coupling the call management system to the destination telephone and the originating telephone to receive supervisory signalling relative to the originating telephone and the destination telephone;
    the call management system configured to:
    (a) receive an inbound call from an originating telephone, said inbound call destined for the destination telephone;
    (b) prior to connecting the inbound call to the destination telephone, perform processing at the call management system including the steps of:
       (i) parsing caller-id information received with said inbound call to obtain a calling telephone number associated with the originating telephone;
       (ii) identifying, based on a call memo database and the calling telephone number, a call memo associated with the calling telephone number;
       (iii) after said destination telephone is off-hook, and prior to connecting the inbound call to the destination telephone, providing a playback of the identified call memo at the destination telephone;
       (iv) during the playback of the identified call memo, monitoring for a predetermined key press at the destination telephone and if a predetermined key press is detected interrupting the playback of the identified call memo, prior to the completion of the identified call memo and at the time said predetermined key press is detected; and
    (c) after the playback or after the interrupting, connecting the inbound call to the destination telephone.

* * * * *